United States Patent
Ito et al.

(10) Patent No.: US 12,311,796 B2
(45) Date of Patent: May 27, 2025

(54) E-FLEET AGGREGATOR

(71) Applicant: Panasonic Intellectual Property Management Co., Ltd., Osaka (JP)

(72) Inventors: Tomoki Ito, Hyogo (JP); Akinori Yukimasa, Nara (JP); Satoshi Ohara, Osaka (JP); Yasuyuki Shintani, Hyogo (JP); Kimihiko Nakatsukasa, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 791 days.

(21) Appl. No.: 17/522,083

(22) Filed: Nov. 9, 2021

(65) Prior Publication Data
US 2023/0143398 A1    May 11, 2023

(51) Int. Cl.
| | |
|---|---|
| *H02J 7/00* | (2006.01) |
| *B60L 53/62* | (2019.01) |
| *B60L 53/67* | (2019.01) |
| *B60L 53/68* | (2019.01) |
| *H02J 7/14* | (2006.01) |

(52) U.S. Cl.
CPC .......... *B60L 53/62* (2019.02); *B60L 53/67* (2019.02); *B60L 53/68* (2019.02); *B60L 2240/72* (2013.01); *B60L 2260/54* (2013.01)

(58) Field of Classification Search
CPC .......... B60L 53/62; B60L 53/67; B60L 53/68; B60L 53/50; B60L 53/53; B60L 2240/72; B60L 2260/54

USPC .......... 320/109
See application file for complete search history.

(56) References Cited

U.S. PATENT DOCUMENTS

| | | | |
|---|---|---|---|
| 11,715,957 B2* | 8/2023 | Kinomura | H02J 3/322 |
| | | | 700/295 |
| 2013/0166081 A1 | 6/2013 | Sanders et al. | |
| 2018/0264966 A1* | 9/2018 | Kubota | H02J 7/0025 |
| 2020/0139842 A1* | 5/2020 | Logvinov | B60L 53/52 |
| 2020/0398693 A1* | 12/2020 | Haraguchi | H02J 13/00006 |
| 2021/0086647 A1* | 3/2021 | Kiessling | B60L 53/67 |
| 2021/0086648 A1* | 3/2021 | Lin | B60L 53/53 |
| 2021/0261015 A1* | 8/2021 | Wang | B60L 53/63 |
| 2021/0396535 A1* | 12/2021 | Kogo | G06F 16/909 |
| 2022/0009368 A1* | 1/2022 | Li | H02J 7/00712 |
| 2022/0134901 A1* | 5/2022 | Wang | B60L 53/62 |
| | | | 320/109 |
| 2022/0194250 A1* | 6/2022 | Hamada | H02J 3/466 |
| 2022/0194251 A1* | 6/2022 | Hamada | B60L 53/63 |
| 2022/0242262 A1* | 8/2022 | Chen | B60L 53/62 |
| 2022/0393491 A1* | 12/2022 | Zhang | H02J 7/0013 |
| 2023/0122692 A1* | 4/2023 | Spina | B60L 53/66 |
| | | | 320/109 |
| 2023/0415605 A1* | 12/2023 | Ozaki | B60L 58/12 |

* cited by examiner

*Primary Examiner* — Alexis B Pacheco
(74) *Attorney, Agent, or Firm* — Wenderoth, Lind & Ponack, L.L.P.

(57) ABSTRACT

The present application provides a method of controlling an EV charger which is located at a charging site by a controller. The controller provides a charging signal thereto for controlling the EV charger to operate within a threshold power that is allowable at a management site. The method comprising receiving a consumption power reading used in the management site, and controlling a charging power to the EV charger so that the consumption power is less than the maximum consumption power.

15 Claims, 11 Drawing Sheets

E-FLEET AGGREGATOR

FIELD OF THE INVENTION

The present application relates to a controller for controlling an energy flow to an EV charger. The application also relates to a power grid having the controller. The application further relates to methods of using the controller for controlling an energy flow to an EV charger.

BACKGROUND OF THE INVENTION

Commonly, utilities provide communication channels managed by a cloud of the utility which communicates directly with electric vehicle charging providers.

Below are two prior arts relating to scheduling of EV charging.

US20210086647A1 provides a control of electric vehicle (EV) charging across multiple customers and multiple fleets of EV which may be achieved by machine learning methods.

US20130166081A1 provides systems and methods for DER (distributed energy resource) management using virtualized command to control the corresponding one or more physical devices at the site.

Instead of providing a quicker response to the needs and demands of the loads, time is wasted to negotiate with the load before actions are taken to optimise transmission and distribution of energy. The problem is exacerbated with an increasing number of electric vehicles charging stations which have different communication protocols.

The increasing number of electric vehicles charging stations in commercial and residential premises has posed a problem on the energy transmission and distribution of a power grid or electrical grid, in particular, the stability and reliability of the energy supply in the power grid.

The present application discloses an improved method of managing the power network by using the controller. The controller can manage EV charging of various charging providers for vehicle fleets having different communication protocols and connectivity methods to the controller.

The controller is also able to schedule the load based on real-time power consumption and taking note of the connectivity features of the different EV charger suppliers in case of power surge and need to schedule. The controller uses real-time data coupled with the connectivity feature such as a direct communication providing a faster suppression, an indirect communication providing a slower suppression sequentially and control of other energy storage. A combination of these 3 factors is essential in enabling a systematic scheduling control.

Hence, the present application aims to provide an improved energy flow transmission and distribution controller which delivers a reliable energy supply. The present application also aims to provide a timely load management and buffering to ensure that the site is operating within the threshold at any situation. The situation may include normal and peak hours, or other unforeseen situations based on the instructions of the utility.

SUMMARY OF THE INVENTION

The present application intends to present one or more new and useful methods of using a controller for controlling an energy flow. Essential features of the patent application are provided by the independent claims, whilst advantageous features of the patent application are presented by the dependent claims respectively.

According to a first aspect, the present application provides a method of controlling an EV (Electric Vehicle) charger. The EV charger is located at a charging site. The EV charger is controlled by a controller which provides a charging signal. The controller provides a charging signal to the EV charger. The charging signal from the controller instructs the EV charger to operate within a maximum consumption power. A threshold power which is less than the maximum consumption power is predetermined by a management site.

The controller can be a site controller which is in the management site. The site controller has a controller itself. For clarity, the controller in the site controller is known as a processor. The site controller comprises the processor, a site switch, and a site router.

The site controller is configured to gather information from the asset via the measuring unit. The site controller also controls the energy flow in the power grid or electrical grid or network for achieving cleaner and reliable energy flow. The configuration provides the status of the asset to be measured by the measuring unit and is fed to the site controller for further actions. For example, a power meter (measuring unit) measures the current, voltage and frequency of the electricity that is supplied to an electric vehicle (EV) charging station (load asset) with an electric vehicle docked at the electric vehicle charging station. The information is communicated wirelessly or hardwired to a remote site controller which may be residing at a utility site which may be monitored with or without a human operator. The example provided is for one EV charging station. However, there can be more than one EV charging station connected to the network or loads.

The site controller can determine the rate of electric flow to the load and in this case, the EV charging station as well as a schedule or preferred time to charge or discharge the battery onboard the docked electric vehicle. The site controller serves as an intermediary that negotiates with the utility. The site controller has relevant and concise information on the connected load and their electrical demand on the power grid. Having the information, the site controller can negotiate with the utility to provide preferential rate in terms of monetary benefits or preferential electrical supply at specific time or times of a day. Hence, achieving a cleaner and reliable energy flow which leads to reduce carbon footprint.

The site controller has a processor onboard the computer, in the cloud server, in the hub, in the router, in the switch, in the node or a combination thereof. The processor in tandem with a storage medium contains algorithms for communicating with the source asset (utility) and the load asset (EV charging station). Communication involves negotiating with both the load asset and the source asset. The site controller can aggregate or gather (acquire) the demands of the load asset and negotiate with the utility or vice versa. The site controller controls the energy flow, scheduling (scheduling use of energy at specific time period/time) and determining of costs. The energy flow relates to the transmission and distribution of electrical energy in the power grid or network.

The network comprises a power grid and a grid network which provides a computer network consisting of computer systems connected in a grid topology. The source asset and the load asset are directly or indirectly communicating with the controller using communication protocols such as HTTPS, MODBUS, TCP (Transmission Control Protocol), OCPP (Open Charge Point Protocol) and standards such as OpenADR (Open Automated Demand Response) in the grid network.

The charging signal which instructs the EV charger can comprise a switching on signal, a switching off signal and a general signal. The switching on signal can instruct the EV charger to exploit the power in full capacity. For example, a typical EV charger uses 7,500 Watts. Hence, when the switching on signal is activated, the EV charger can charge a connected electric vehicle in full capacity in a specific time. On the contrary, if the switching signal were deactivated, the EV charger will be off. A general signal can be activated when the EV chargers are on but the power which is fed to the connected electric vehicle is not at a maximum capacity. For example, in a case when the sites excluding the charging site need power, the power to the charging site is reduced to cater to the demand of the other sites. The general signal is then activated to instruct the EV charger that only 5,000 W (just an example value) is available for charging of the electric vehicle.

The site controller is configured to couple to a utility and couple to a load for controlling the energy flow. The energy flow can also be known as a power flow. The site controller provides a determined output taking into consideration limitations and constraints set forth by the utility and/or the load in the power grid. The energy flow can be related to a transmission and distribution of electrical energy or electrical power.

The management site encompasses entities such as the site controller, the charging site and a power consuming site. In other words, the site controller, the charging site, and the power consuming site are in the purview of the management site. The management site can be a physical site with connections coupling to the described entities. The entities may further include energy sources such as renewable energy sources, fossil fuel generated energy sources and other energy consuming loads. The entities in the management site may be coupled to the utility via the site controller. The entities in the management site may further comprise a storage battery site and a measuring unit.

The method of controlling an EV charger comprises the steps of firstly, receiving a consumption power reading. The consumption power reading is taken at the management site and received by the site controller; secondly, monitoring a power difference between the consumption power and the threshold power; and thirdly, controlling a charging power by the site controller to the EV charger so that the consumption power doesn't exceed the maximum consumption power.

The site controller is configured to communicate the charging signal to the EV charger either directly or indirectly using more than one communication scheme in actual time or in real-time. The communication scheme comprises a communication protocol, a communication architecture, or a communication system.

The charging site comprises more than one EV charger. The EV chargers can be managed by more than one EV charging operator. In other words, more than one EV charging operator can manage and operate several EV chargers at the same charging site. The more than one EV charger may further comprises a first EV charger for communicating with the site controller using a first communication scheme directly and a second EV charger for communicating with the site controller using a second communication scheme indirectly.

The communication between the site controller and the EV chargers at the charging site may comprises more than one communication protocol such as OCPP (Open Charge Point Protocol) which is an application protocol for communication between the EV (Electric Vehicle) charger and a central management system. The EV charger can also be known as EV charging station. The central management system is also known as a charging station network which provides an open application protocol which allows EV charging stations and central management systems from different vendors or EV charging operators to communicate with each other. EV charging operators also known as the first EV charger using the communication protocol OCPP can communicate with the site controller directly.

However, there may be alternative EV charging operators in the same charging site adopting a different communication protocol. In such a case, the site controller can communicate with the alternative EV charger or the second EV charger indirectly. The indirect communication between the site controller and the alternative EV charging operator uses the different communication protocol via a EV charging operator. The EV charging server belongs to the alternative EV charging operator.

The storage battery site in the management site comprises an array of batteries to provide power to the entities as well as a back-up power in case of a power outage.

The power consuming site comprises electrical loads such as lightings, air ventilation in buildings and elevators in buildings.

The measuring unit in the management site comprises a sensor, a detector, a power meter, a smart meter, a measuring equipment for monitoring a status of the asset which include but not limiting to an electrical power flow, a potential difference (voltage), an electrical current and a frequency. The frequency relates to the electrical frequency typically 60 Hertz (Hz) in the United States of America whilst most of the countries are 50 Hz. The asset can be an electrical load, an electric vehicle supply equipment (EVSE) or the electric vehicle (EV) charger or the charging site or the power consuming site.

The asset can be further classified into three groups namely a source asset, a load asset and a data asset. The source asset comprises renewable energy (RE) sources such as photovoltaic system making use of solar cells to generate electricity, hydropower which harnesses energy from a water flow to turn water turbines to generate electricity or wind power which harnesses energy from an air flow turning wind turbine to generate electricity or geothermal or tidal power which harnesses energy from the movement of water during the rise and fall of tides.

The load asset, on the other hand, comprises electric vehicle (EV) charging station or electric vehicle supply equipment (EVSE), battery, battery energy storage system (BESS), household appliance, industrial appliance, office appliance, consumer electronics, water heater, heat pump, refrigeration system, et cetera. The battery can be in a state of an energy contributor or a state of an energy consumer. During charging, the battery is an energy consumer whilst during discharging, the battery is an energy contributor. In a state of energy contributor, the battery can be used to power up electrical appliances in a building or supplying power back to the power grid.

Data asset comprises information from at least one cloud service. For example, information of electric vehicles in terms of location, battery level is uploaded onto the cloud service. The information can be uploaded by transport companies owning a fleet of electric vehicles. Transport companies are such as logistics companies or transport companies namely electric buses, electric cabs (taxis).

The power meter provides a measurement of a power that is transmitted to the entities. For example, a power measurement from the utility to the management site; a power measurement from the management site to the charging site; a power measurement from the management site to the power consuming site. In other words, the power meter is located between two entities to obtain power measurement for monitoring and controlling the energy flow.

The site controller receives a consumption power reading of the power used in both the charging site and the power consuming site. The consumption power reading provides a power consumed by the charging site and the power consuming site. The charging site relates to the EV chargers whilst the power consuming site relates to the electrical loads in the building. The consumption power reading is provided from the measuring unit in the management site to the controller in real-time.

The power difference between the threshold power (minuend) and the consumption power (subtrahend) is a positive value to achieve safe operation. In other words, in a normal state of operation the threshold power should be higher than the consumption power. The threshold power is determined by taking a part of a maximum power. For example, the maximum power is 100 kW, the threshold power is determined by multiplying a multiplier of 80% to the maximum power which yields 80 kW. The threshold power is derived from a part of a contracted value with the utility and controlled by the site controller for monitoring the consumption power to attain a safe operation. The contracted value can be an agreed amount of power supplied by the utility, or an agreed power consumption by the loads. In other words, the contracted value can be a supply power or a consumption power or both agreed by both the utility and the site controller.

The multiplier can be predetermined by the site controller. The site controller acts as a middleman between the utility and the loads coupled to the site controller. The loads are the charging site and the power consuming site. Advantageously, the utility can focus on sourcing for energy source and providing energy to its customers. The management of the customers is outsourced to the site controller which is focused in managing the energy flow from the utility to the loads. The site controller negotiates the amount of power demanded by the loads and the power supply supplied by the utility.

The threshold power can comprise a first threshold power and a second threshold power. The first threshold power or a first operational limit is determined by a total electrical energy demanded by the assets. For example, the asset can be an electric vehicle supply equipment (EVSE) or an electric vehicle (EV) charger. For example, the EV charger power limit is set at 7,500 Watts. The power limit of the EV charger is a first infrastructure limit. The first operational limit can be set at 80% of the first infrastructure limit which is 6,000 Watts.

The second threshold or a second operational limit refers to part of a maximum power produced by an energy source. The maximum power produced by the energy source is known as a second infrastructure limit, in other words, the infrastructure limit is defined by the hardware itself. The second operational limit can be determined by an operator. The operator in this case may be a utility company or a third-party company in collaboration with the utility company. For example, the operator can determine the second operational limit to be 70% of the second infrastructure limit for limiting the energy flow between assets. The limit helps to extend operational life of the energy source, equipment, and others. The limit further helps to balance the energy usage throughout a day without stressing the power grid or electrical grid at certain time of the day especially during peak hours.

There is a suppression initiation time which is initiated when the consumption power exceeds the threshold power. The suppression initiation time marks the beginning of a series of actions taken by the site controller to manage the energy flow to prevent an overload to the power network. For example, a suppression may comprise an action of cutting power supply to the charging site to direct the power supply to the power consuming site. Recalling the charging site is the site of EV chargers whilst the power consuming site comprising loads in the building(s). Supplying electrical power to the power consuming site takes priority to maintain essential service and normal daily operation such as building illumination and ventilation.

The time taken to resume normal power consumption by the charging site and the power consuming site can be defined as a site response time (tr). The site response time comprises three significant times. Firstly, the suppression initiation time by the site controller (t1) whereby the consumption power exceeds the threshold power; secondly, a peak consumption power time (t2) whereby the consumption power reaches a peak and the charging site and the power consuming site responded to interventions initiated by the site controller; and thirdly, a resumption of a normal consumption power time (t3) whereby the consumption power goes below the threshold power. The intervention can be the suppression of power supplied to the charging site. The site response time (tr) is calculated by the following formula, $(tr)=(t3)-(t1)$.

The charging signal from the site controller controls the EV charging site and the power consuming site. The EV charging site comprises the EV chargers and the storage battery whilst the power consuming site comprises lightings, air conditionings, heat pumps, elevators, and other loads in the building.

The charging signal from the site controller can further comprise a buffering signal and a demand response (DR) signal. The buffering signal and the demand response signal can be operating in two modes namely a scheduled mode and a non-scheduled mode. In a normal operation, the utility and the management site operate in a non-scheduled mode.

The scheduled mode comprises a dynamic buffering, a scheduled buffering, a dynamic demand response and a scheduled demand response.

Dynamic buffering provides a management of service point power in real-time or management of the power fed into the management site in real-time. The service point power can be known as a management site power. The buffering operates in the premise of setting a boundary to curb power surge leading to an overload to the power grid disregarding the loads connected to the power grid. The threshold power is the boundary which is derived from the maximum power. Buffering is defined as a curtailment or a control of the power to the loads to maintain a normal operation of the power grid without disruption.

Scheduled buffering provides the management site power based on past energy demands. The knowledge of past energy demand provides information for the utility and the site controller to know the time of a day, the weeks in a month and the months in a year as well as the location on the power demand. With an increasing information of the power demands in the power grid, the utility and the site controller can create a schedule to cater to the power demands making the power grid more stable and efficient.

Dynamic demand response provides a committed curtailing of an energy real-time. The difference between the dynamic demand response and the dynamic buffering is in the dynamic demand response responds to the power demand needs of the loads and considering the boundary set by the utility and executed by the site controller. The site controller is either owned by the utility or outsource to a third-party vendor to manage its operations.

The scheduled demand response provides a timed curtailing of the energy based on past energy demands as well as the threshold power set. For example, based on a one-week history of the power demands of the loads at specific time of the day, the utility has committed to allocate power to the specific loads at specific locations.

The non-scheduled mode comprises a service point management in which a power grid is normally operating. Service point is the point of connection between the facilities of the serving utility and a premises wiring. In other words, the "service point" is the point of demarcation between the utility supply and the premises wiring system. The premises wiring is the management site.

In summary, the buffering provides the management of the service point power to be within the operating limit setting during the operating modes. The operating limit can be dynamically set by the utility operator. The operating limit can be seen as the threshold power. The demand response (DR) provides a committed curtailment of energy flow during high demand or a peak period of the day or high constraint on the grid. Hence, in DR it is possible to curtail certain amount of energy to reduce the constraint on the management site.

Buffering or demand response (DR) operates based on a schedule or a plan. In a non-scheduled mode, the management site will run under service point management i.e., utility supplying power to the charging site and the power consuming site. Both the charging site and the power consuming site are under the purview of the management site.

The site controller sends the charging signal to discharge from the storage battery site before suppressing the charging power of the first EV charger and the second EV charger sequentially. The priority to maintain a stable operation of the power grid is of interest to the utility. The site controller provides control of the power supply to the charging site and the power consuming site with the consideration of the power demand thereof. In summary, the difference between the first EV charger and the second EV charger is the communication path between the site controller and the first EV charger is direct whilst the communication path between the site controller and the second EV charger is indirect. The communication between the site controller and the second EV charger is via the EV charging server which is owned by the second EV charger. The site controller sends the charging signal to charge the second EV charger via the EV charging.

The first EV charger relates to use of an open communication protocol which is commonly used in the EV charging market. The second EV charger relates to the use of proprietary communication protocol which may be exclusive to the second EV charger.

The storage battery site is charged before and/or after a demand response or buffering period. During a non-peak period of the day, the storage batteries in the storage battery site are charged by the power from the utility to prepare for discharging to supply to the charging site and the power consuming site.

In a normal operating state, the utility supplies power to the charging site and the power consuming site. During a peak-period, the priority of the site controller is to maintain power supply or energy flow to the essential loads to maintain normal daily activity such as the loads at the power consuming site. The site controller regulates the power flow to maintain the power flow to the power consuming site and the charging site.

The distribution of power in the charging site is divided according to the type of EV chargers. Within the charging site, there are the first EV chargers and the second EV chargers. The first EV chargers are being suppressed first in the circumstance when the consumption power exceeds the threshold power. If the power consumption still did not resume to a normal consumption power, the second EV chargers will then be suppressed. Suppression is defined as an adjustment of the consumption power to a lower value or a lowering of the consumption power.

The first EV chargers are directly coupled to the site controller which uses a first communication protocol. The direct coupling between the site controller and the first EV charger provides a quick site response time. In other words, shorter time to establish communication.

The second EV chargers are indirectly coupled to the site controller which uses a second communication protocol or proprietary communication protocol. In fact, the second EV chargers are coupled to the site controller via the server of the charging operator. The additional entity in the communication channel inherently provides a slower site response time.

As a result, in the case where the site controller controls to suppress both a charging power of the first EV charger and a charging power of the second EV charger simultaneously, the suppression of the charging power of the first EV charger begins earlier than the suppression of the charging power of the second EV charger.

Considering the circumstance during the peak period, it is easier and faster to control EV chargers that are directly coupled to the site controller instead of indirect coupling. If the consumption power were still high after suppressing the two types of EV chargers, the stored power is discharged to service the charging site or the power consuming site or both from the storage battery site.

Alternatively, the priority of suppressing the first EV charger or the second EV charger by the site controller is based on the site response time to the site controller. The site response time can be determined by a number of first EV chargers coupled directly to the site controller or a number of second EV chargers coupled indirectly to the site controller or a combination thereof. For example, the number of first EV chargers that are coupled to the site controller is more than the number of second EV chargers that are indirectly coupled to the site controller, the site response time between the site controller and the first EV charger will be longer than the site response time between the site controller and the second EV charger. In such a circumstance, then the second EV charger would be suppressed first followed by the first EV charger. On the contrary, if the number of second EV chargers is more than the first EV chargers then the first EV chargers would be suppressed first followed by the second EV chargers.

The information can further comprise a measurement of potential difference (voltage), a measurement of frequency, a measurement of electrical current, a measurement of power, a measurement of phase shift, a time of a day, a plan of at least one electric vehicle (EV), an EV identifier, a location of the electric vehicle and an energy reading of the battery (state of charge) onboard the electric vehicle. The plan of the EV may include a route plan, a scheduled time at a specific location or a current location of the electric vehicle or a combination of the listed.

The present application provides a method for monitoring an energy flow by a site controller for charging an EV. The method comprises a first step of establishing a communication path between the site controller and an asset; a second step of acquiring information of the asset by a measuring unit; a third step of determining a status of the asset; and a fourth step of calculating an energy consumption or energy contribution of the asset. By monitoring the energy flow between assets, an infrastructure limit can be determined or derived. In other words, knowing the power contributed by energy sources and the number of loads that can be coupled to the energy sources help to ascertain the infrastructure limit of electrical energy usage or delivery. Alternatively, the infrastructure limit can be based on a contracted value with the utility. In other words, the utility is obligated to supply a fixed power to the management site. Yet another possible definition of the infrastructure limit is an agreed value between the utility and the management site.

Prior to controlling an energy flow, the communication path is established between the site controller and the asset. The site controller is communicatively coupled to a measuring unit. The measuring unit is coupled to the asset to monitor the status thereof. Information such as voltage, current, frequency, power, are read either directly or via derivation to determine the status of the transmission line. The site controller can determine the type of asset being coupled to itself. For example, a source asset such as a photovoltaic system can be detected by its unique characteristics of intermittency or unstable power flow as a result of weather pattern changes.

Alternatively, the human operator can manually input the type of asset coupled to the controller in the power grid which will be ideal. However, there may be situation when there is a surge in the number of load asset being connected to the power grid and is unknown to the controller. Knowing the type of asset, the site controller is able to determine whether the asset is consuming power from the power grid or contributing power to the grid. For example, the site controller via the measuring unit can be made known that the asset is able to contribute to the power grid and hence the site controller can control the reliance on the electrical energy provided by the utility.

The present application also provides a method for monitoring a summary of revenue by the site controller. The method comprises a first step of establishing a communication path between the site controller and an asset; a second step of acquiring information of the asset by a measuring unit; a third step of calculating an energy consumption or energy contribution of the asset; and a fourth step of displaying the calculated consumed energy or contributed energy expressed in financial aspect (dollar and cents). The display can be on a dashboard of the human operator which may be remotely located.

The measuring unit provides monitoring of status of the assets to determine the energy consumption or energy contribution. Energy consumed by the load assets are charged by the operator of the site controller whilst energy contributed by the load assets which is fed back to the power grid may be offered monetary reward by the operator of the site controller. The operator in this case may be a utility company or a third-party company in collaboration with the utility company.

The present application further provides a method for a load asset charging. The load asset is an electric vehicle (EV) docking at a EV charging station. The method comprises a first step of establishing a communication path between a site controller, a measuring unit and the load asset; a second step of determining source of energy (Renewable energy or power grid using fossil fuel) via the measuring unit (power meter) at a network point (a service point) in which the measuring unit is communicatively coupled to the site controller; and a third step of controlling the energy flow from the network point (service point, source of energy) to the load asset or from the load asset to the network point by using a power generation composition ratio from the network point in real time. The power generation composition ratio refers to a measure of the amount of electrical energy supplied from both renewable source and fossil source. If the power generation composition ratio is renewable source to fossil source, that would mean a whole number greater than 1 is a clean energy source which implies contributing to a greener environment.

The measuring unit mentioned thus far is coupled between the site controller and the asset (load asset or source asset). For example, the controller is a hub with the source asset and the load asset coupled thereto. A first measuring unit is coupled to the source asset and a second measuring unit is coupled to the load asset. The measurements taken by the first measuring unit and the second measuring unit are communicated to the site controller.

Optionally, additional measuring unit may be coupled in parallel. For example, a first measuring unit is coupled to the source asset and the first measuring unit is coupled to the site controller. A second measuring unit may be coupled to the source asset in parallel to the first measuring unit. This is to provide a redundancy in the event of a malfunction of the first measuring unit or a fail-safe feature.

Furthermore, a malfunction or a faulty measuring unit may contribute unstable energy transmission and distribution because the site controller relies on information provided by the measuring unit to determine a preferred action such as curtailment of electric supply to the load during a peak hour period. In an event of a measuring unit malfunctioning, a method of circumventing is provided.

The present application still further provides a method for maintaining a reliable energy transmission comprises a first step of identifying an identification of a measuring unit; a second step of identifying a location of a fault; a third step of selecting a plan relating to the location of the fault; a fourth step of executing the plan to resume reliable energy transmission.

The location of the faulty measuring unit indicates an area of interest or concern. For example, a group of EV charging stations located at Pasadena, California which are coupled to a group of power meters (measuring units) are identified as faulty. The site controller is able to determine the location by the identification code which is embedded in each power meter. After identifying the location, the site controller retrieves information relating to the power consumption of Pasadena, California. The information relates to the past power consumption of that locality at that specific time. For example, a fault is identified at 0900 hrs at Pasadena, the site controller retrieves information on the power consumption one day before the incident occurred. If the incident happened on a Monday morning 0900 hrs, the site controller would retrieve information which corresponds to a Monday morning like a week before instead of Sunday morning. The information can be retrieved from a cloud storage.

Alternatively, if there were no such information available, the site controller will be based on the power consumption the day before and factor in figure or a percentage to reflect on the current power demand. For example, if the fault happened on a Monday morning, and there was no information found for last Monday morning, the controller will automatically use Sunday morning information and multiply a factor of ten just for illustration.

In order to achieve accuracy in the prediction of the demand of charging of electric vehicles, a log of electric vehicles movement and charging patterns are recorded in a secured storage medium.

BRIEF DESCRIPTION OF DRAWINGS

The accompanying figures (FIGS.) illustrate embodiments and serve to explain principles of the disclosed embodiments. It is to be understood, however, that these figures are presented for purposes of illustration only, and not for defining limits of relevant inventions.

DETAILED DISCLOSURE OF EMBODIMENT

Exemplary, non-limiting embodiments of the present application will now be described with references to the above-mentioned figures.

Figure 1A:
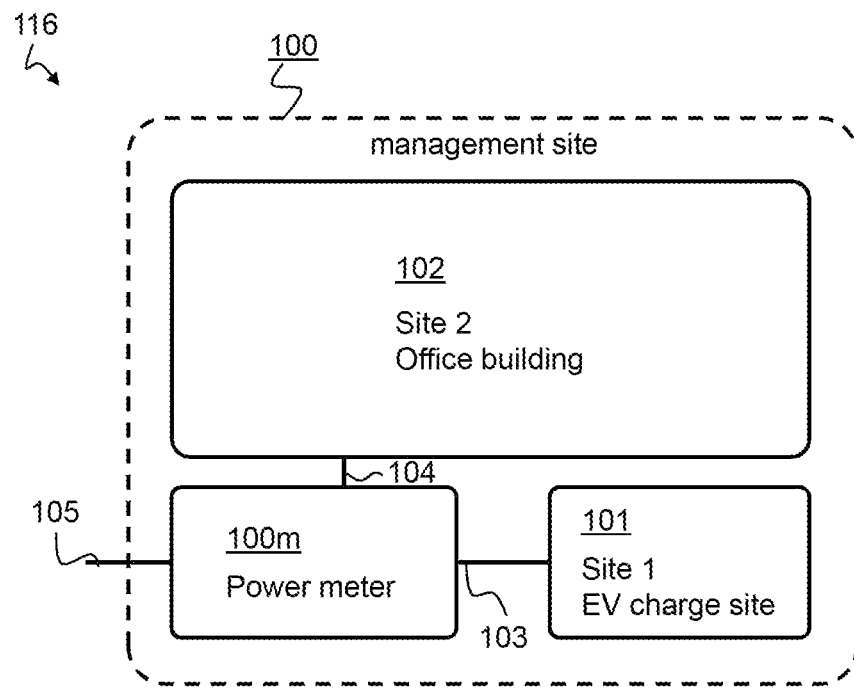
FIG. 1A illustrates a layout of a management site.
Figure 1B:
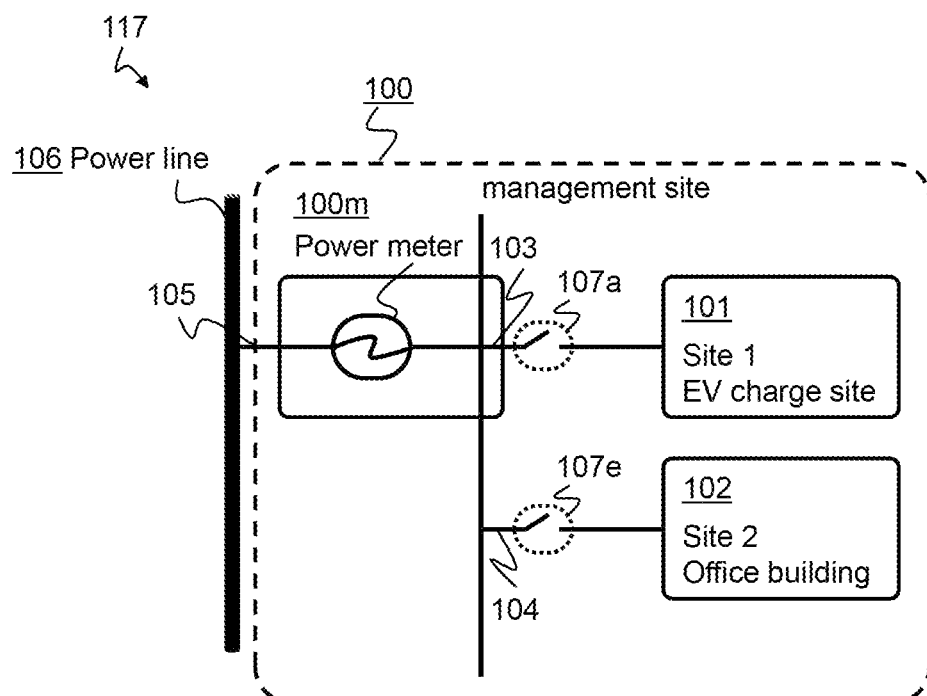
FIG. 1B illustrates a line diagram of the management site and associated sites.

FIG. 1A and FIG. 1B illustrate a layout of management site 100. In particular, FIG. 1A (116) provides a general layout of management site 100 which comprises first site 101, second site 102 and proprietary power meter 100m. First site 101, second site 102 and proprietary power meter 100m are each denoted by oblong with solid line. A broken-line oblong circumscribes the three solid-line oblongs.

The broken-line oblong denotes power network 100 which is management site 100. Within the power network are first site 101 which is also electric vehicle charging site 101 powered by first consumption power 103 and second site 102 which is also office building site 102 powered by second consumption power 104. First consumption power 103 and second consumption power 104 are measured by proprietary power meter 100m. Service point power 105 or management site power 105 is fed to management site 100 via proprietary power meter 100m. First consumption power 103 and second consumption power 104 are then fed to electric vehicle charging site 101 and office building 102 respectively. Second site 102 or office building site 102 is also known as power consuming site 102 as will be described in FIG. 2.

FIG. 1B (117) illustrates a line diagram of management site 100 and its associated sites namely charging site 101 and office building site 102. Utility power 106 provides management site power 105 to management site 100. Management site power 105 is fed to an input of proprietary power meter 100m. An output of proprietary power meter 100m is then coupled to a bus line. The bus line is coupled to two switches namely first site switch 107a and second site switch 107e. First site switch 107a is coupled to EV charging site 101 in which first consumption power 103 is transmitted thereto. Second site switch 107e is coupled to office building site 102 in which second consumption power 104 is transmitted thereto.

Functionally, the management site provides a clear demarcation of entities under its purview. For illustrative purpose, management site 100 has two entities, EV charging site 101 and power consuming site 102. Proprietary power meter 100m provides a power measurement specifically the power being consumed by the entities. Proprietary power meter 100m is owned by a third-party operator which in this case is a company. The ownership of proprietary power meter 100m provides fast access of the measurement, in other words, a quicker response to abrupt power demands by the entities.

Figure 2:
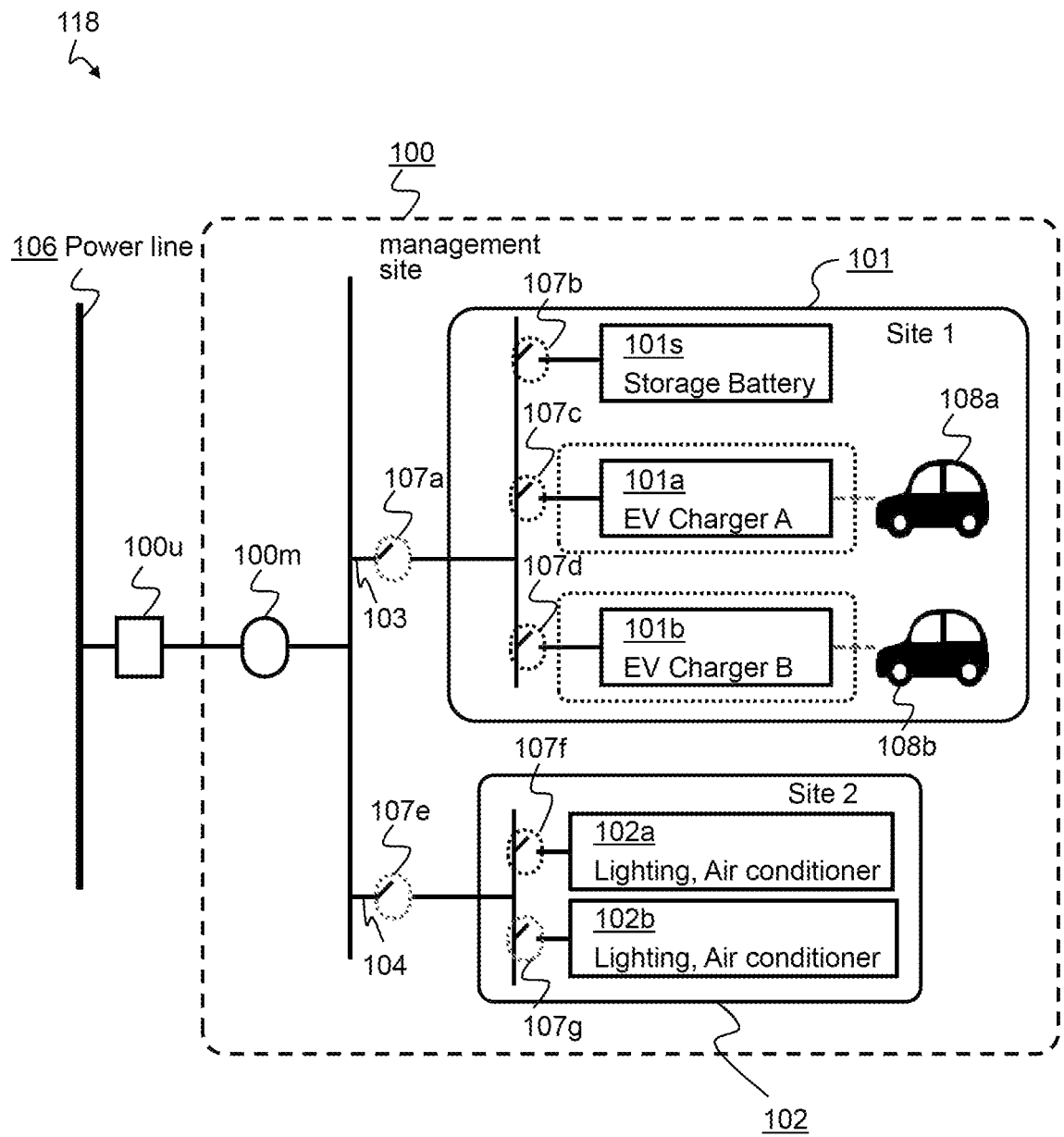
FIG. 2 illustrates a second detailed layout of the management site.

FIG. 2 (118) provides a further detail of management site 100. The detail is an introduction of utility power meter 100u, storage battery 101s in EV charging site 101 and a plurality of lightings and air conditioners 102a, 102b in office building site 102.

Utility power 106 is coupled to input of utility power meter 100u before coupling to the input of proprietary power meter 100m in management site 100. First site switch 107a and second site switch 107e is coupled to the output of proprietary power meter 100m. First site switch 107a is coupled to EV charging site 101 whilst second site switch 107e is coupled to office building site 102. In EV charging site 101, there is storage battery 101s which is coupled to battery switch 107b, first EV charger 101a which is coupled to first EV charger switch 107c, and second EV charger 101b which is coupled to second EV charger switch 107d. battery switch 107b, first EV charger switch 107c and second EV charger 101b are coupled to first site switch 107a. First EV charger 101a is coupled to first electric vehicle 108a and second EV charger 101b is coupled to second electric vehicle 108b.

Functionally, utility power meter 100u provides a power measurement supplied by utility 200. Together with proprietary power meter 100m, two power meters 100u, 100m can provide accurate power readings and check for discrepancies. Any discrepancies could mean there may be power loss during transmission and require further investigation. Switches 107 provides the activation and deactivation of specific transmission buses to the entities, similar to a circuit breaker.

Utility power meter 100u belongs to utility 200 (not shown) and proprietary power meter 100m belongs to a separate business entity such as the owner of the management site (not shown).

Utility power meter 100u is owned by utility 200. As utility power meter 100u is owned by a foreign entity (utility), getting a measurement may not be in real time which may hamper power management.

Proprietary power meter 100*m* is owned by the company and the measurement taken is in real time which is fed back to site controller 110 for timely action in controlling EV chargers 101*a*, 101*b*.

Figure 3:
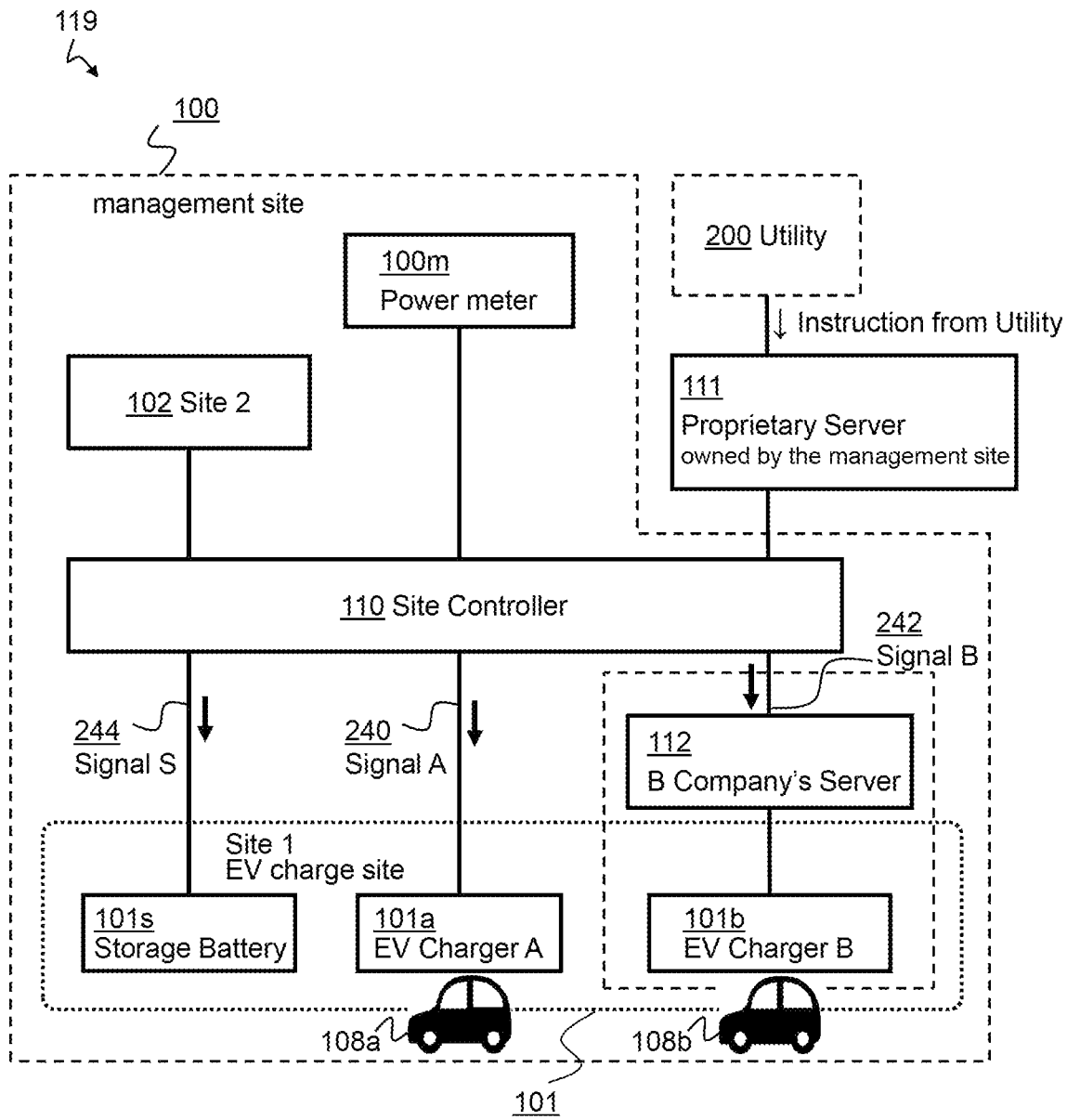
FIG. 3 illustrates a communication layout of the management site and a utility.

FIG. 3 (119) illustrates a communication layout of management site 100 and utility 200. Management site 100 further comprises site controller 110. Site controller 110 is coupled to proprietary power meter 100*m*. Site controller 110 is also coupled with storage battery 101*s*, coupled to power consuming site 102, coupled to first EV charger 101*a*, coupled to charging operator server 112 and to proprietary server 111 before coupling to utility 200. Charging operator server 112 is then coupled to second EV charger 101*b*. Utility 200 is not in the purview of management site 100.

Proprietary server 111 is Cloud server 111. Cloud server 111 can be hosted by a third-party web host such as an Amazon Web Service (AWS). Site controller 110 is able to send charge or discharge signal S 244 to storage battery 101*s* charge or discharge signal A 240 to first EV charger 101*a* and charge or discharge signal B 242 to second EV charger 101*b*.

Functionally, site controller 110 provides control of the different EV chargers and the storage battery based on instruction from utility 200 and a measurement from meter 100*m*. Site controller 110 can autonomously control a consumption power to different EV chargers 101*a*, 101*b* with different communicating protocols at the same time either directly or indirectly.

Figure 4:
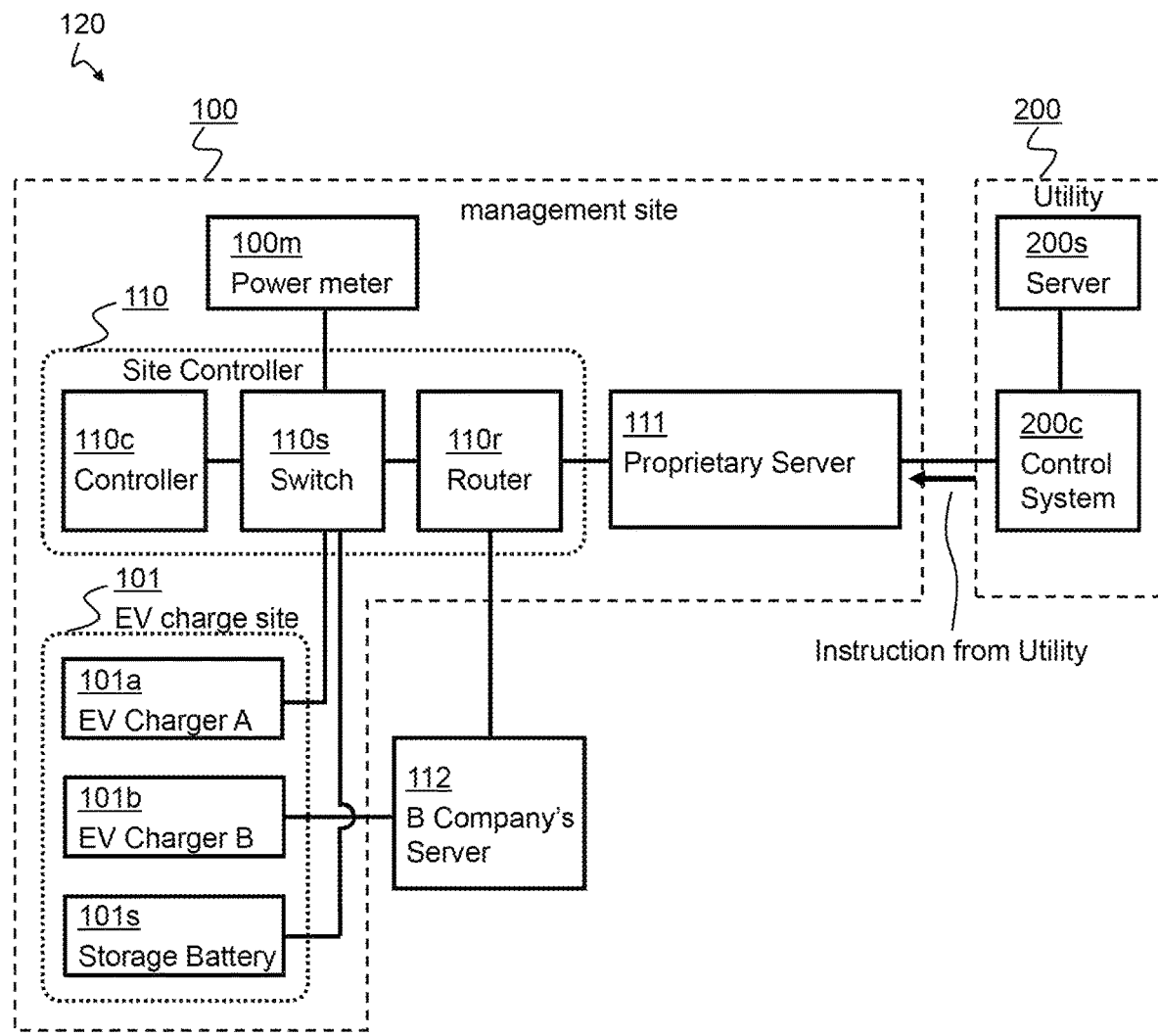
FIG. 4 illustrates a site controller in the management site.

FIG. 4 (120) illustrates site controller 110 in management site 100. Site controller 110 comprises processor 110*c*, controller switch 110*s* and controller router 110*r*. Site controller 110 is coupled to proprietary power meter 100*m* of management site 100. EV charging site 101 of management site 100 is coupled to site controller 110 specifically to controller switch 110*s* or controller router 110*s*. Controller switch 110*s* is directly coupled to first EV charger 101*a* and storage battery 101*s* in EV charging site 101. Controller router 110*r* is coupled directly to charging operator server 112. Charging operator server 112 is then coupled to second EV charger 101*b*. Site controller 110 is coupled to proprietary server 111. Proprietary server 111 is in the purview of management site 100. Proprietary server 111 is owned by the owner of management site 100. The owner is a business entity. Proprietary server 111 is then coupled to utility control system 200*c* of utility 200. Utility control system 200*c* is then coupled to utility server 200*s*.

First EV charger 101*a* is owned by a first charging operator (not shown). Charging operator server 112 and second EV charger 101*b* are owned by a second charging operator (not shown). The communication between controller router 110*r* and second EV charger 101*b* is over an Internet via charging operator server 112. Although EV charging site 101 is in the purview of management site 100, the ownership of first EV charger 101*a* and second EV charger 101*b* belong to the first charging operator and the second charging operator respectively.

Functionally, site controller 110 further provides communication of second EV charger 101*b* of a charging operator via charging operator server 112. The charging operator has its own proprietary communication protocol which is different from the communication protocol of first EV charger 101*a*. Due to its proprietary communication protocol, site controller 110 is not directly connected to second EV charger 101*b*, and site controller 110 is also connected to second EV charger 101*b* by way of charging operator server 112 owned by the charging operator. Site controller 110 is analogous to an intermediary, a negotiator. Site controller 110 contains algorithms to control the energy transmission and distribution of the power grid or an energy flow in the power grid. Site controller 110 acts as an intermediary between utility 200 and EV charging site 101.

The implication is that the speed of communication to second EV charger 101*b* is slower compared to first EV charger 101*a*. Site controller 110 has the flexibility to control the EV charger based on the speed of response in particular to power surges and immediate intervention is warranted such as scheduling control.

The function of charging operator server 112 provides a secured communication channel thereof. An example of charging operator server 112 is ChargePoint Cloud. ChargePoint Cloud provides security for ChargePoint (charging operator of charging stations). ChargePoint releases relevant information enough for site controller 110 to derive or devise an action such as control the power supply to ChargePoint EV charging stations. The ChargePoint cloud uses mobile wireless data communication and hence the communication path is coupled to controller router 110*r*.

Controller router 110*r* provides connectivity to the Internet through the cellular gateway. The cellular router is a moving Internet gateway, such as on a moving vehicle or in an area where landlines are scarce or there are no alternative means of access. The benefit of controller router 110*r* are there is no need for Ethernet cable, phone line, or fiber-optic connection which are required to connect to the Internet. Instead, they can quickly connect to cellular towers that belong to specific networks. Controller routers 110*r* can take advantage of a variety of network technologies. For example, controller routers 110*r* can connect to legacy 2G and 3G networks, as well as more advanced 4G LTE and LTE advanced networks, and 5G.

Cloud system 111 provides "Infrastructure as a service" (IaaS) as a service model. Cloud system 111 uses Amazon Web Service (AWS) which provides online services that provide high-level APIs used to abstract various low-level details of underlying network infrastructure like physical computing resources, location, data partitioning, scaling, security, backup, etc. IaaS clouds provide additional resources such as a virtual-machine disk-image library, raw block storage, file or object storage, firewalls, load balancers, IP addresses, virtual local area networks (VLANs), and software bundles.

Utility control system 200*c* can further comprise a DERMS (distributed energy resources management system) and an ADMS (advanced distribution management system).

The function of the DERMS provides distribution system operators (DSO) or utility 200 to manage the power grids that are mainly based on distributed energy resources (DER). By lack of a common definition, a DERMS thus is something similar or even identical with a Virtual Power Plant (VPP). DERMS is a software platform that is used to organize the operation of the aggregated DER within a power grid. The usual DERMS application is found at the distribution grid level. DERMS typically require a more full-fledged integration of various other systems such as a distribution management system (DSM) for integrating it with a utility. Furthermore, an outage management system (OMS) or a supervisory control and data acquisition (SCADA) system is usually needed to provide all DERMS functionality. The objectives of a DERMS are voltage management of the grid, optimization of the power flow within the grid, and local grid load management (e.g., for smart grid projects).

ADMS is a software platform that supports the full suite of distribution management and optimization. An ADMS includes functions that automate outage restoration and optimize the performance of the distribution grid. ADMS functions being developed for electric utility 200 include fault location, isolation and restoration; volt/volt-ampere reactive optimization; conservation through voltage reduction; peak demand management; and support for microgrids and electric vehicles.

Figure 5:
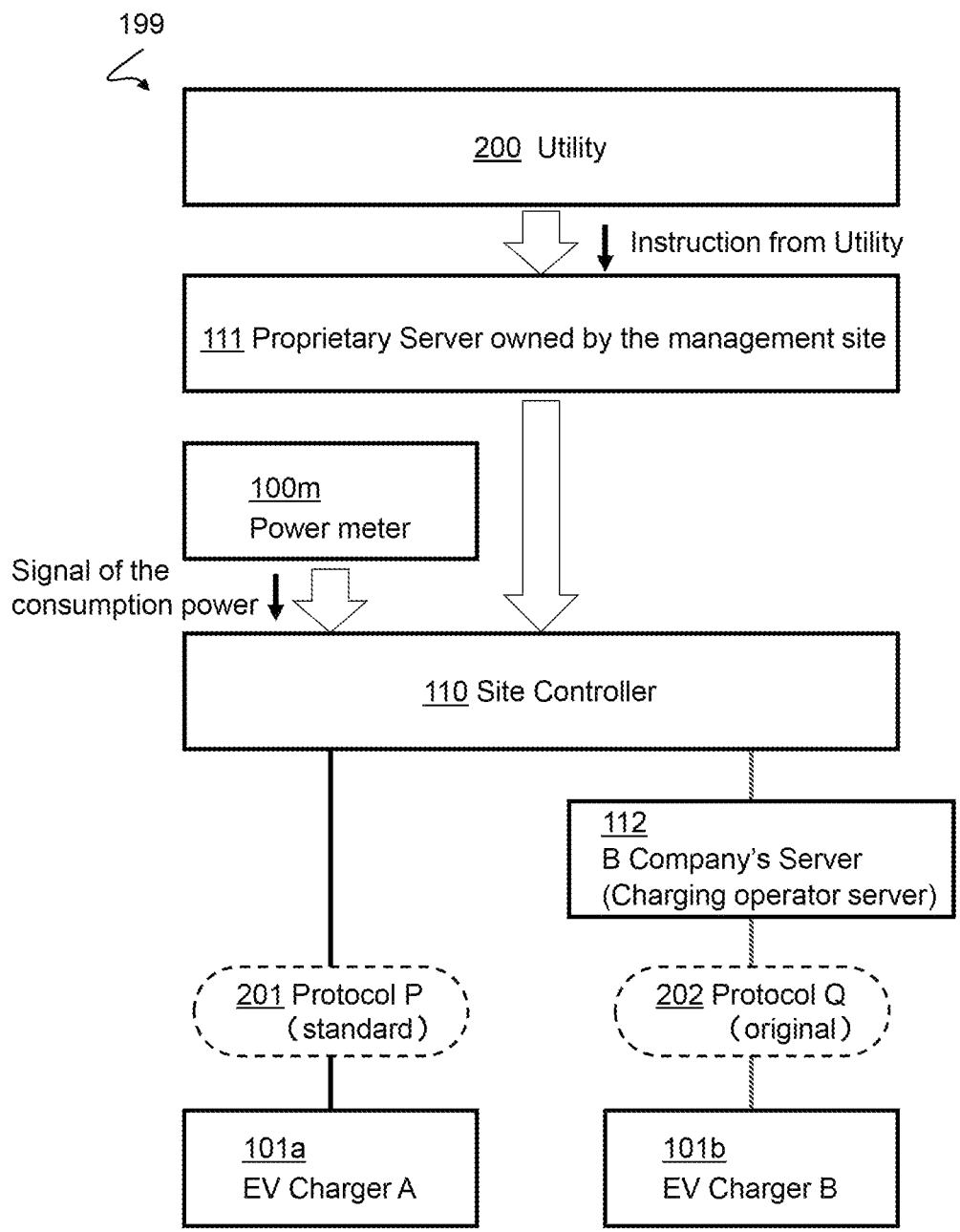
FIG. 5 illustrates an improved communication among the utility, the site controller and the EV chargers.

FIG. 5 (199) illustrates an improved communication among utility 200, site controller 110 and EV chargers 101*a*, 101*b*.

Server 111 (Amazon Web Service) communicates with utility 200 directly. Server 111 also communicates with site controller 110. The three arrows indicate a remote communication access by utility 200, company's server 111 and external web server 203 communicating with site controller 110. Site controller 110 communicates with first EV charger 101*a* directly using standard communication protocol 201. Site controller 110 communicates with second EV Charger 101*b* indirectly via charging operator server 112 which belongs to the second charging operator using proprietary communication protocol 202. "Indirectly" means that site controller 110 communicates with second EV Charger 101*b* via charging operator server 112. Site controller 110 communicates with charging operator server 112 using open standard communication protocol which is different from standard communication protocol 201. Power meter 100*m* is owned by a business that operates a fleet of electric vehicles. The electric vehicles can be a fleet of taxis, a fleet of buses, a fleet of trucks just to name a few examples.

Functionally, site controller 110 additionally can communicate with more than one communication protocol in real-time at a same time. Power meter 100*m* provides the consumption power to site controller 110.

Figure 6A:
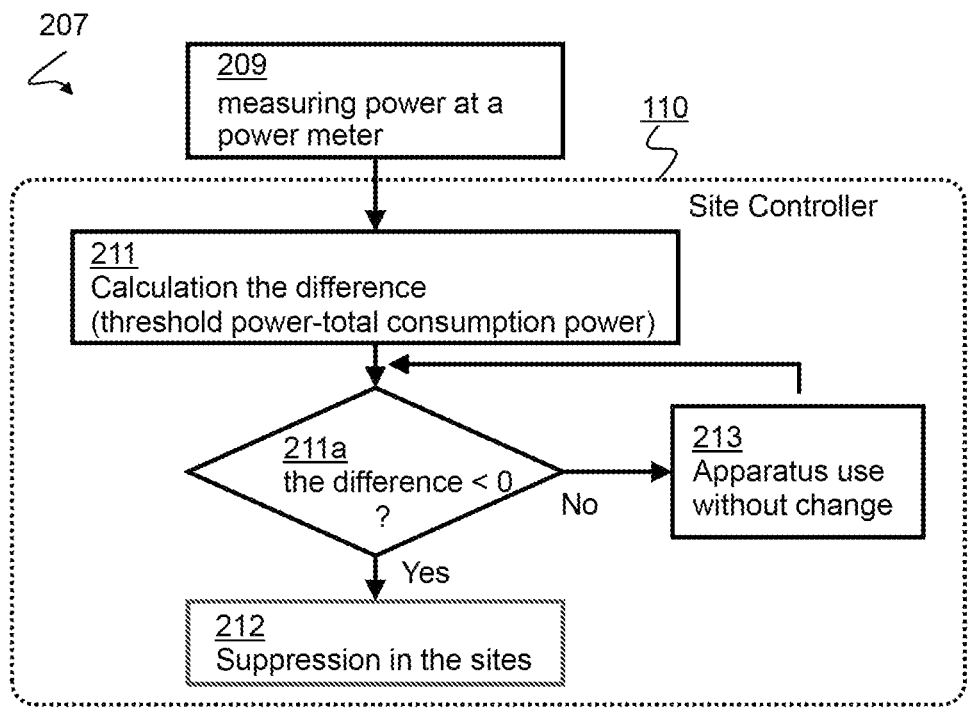
FIG. 6A illustrates a flow chart in which there is no instruction from the utility to the site controller.

FIG. 6A (207) illustrates a flow chart in which there is no instruction from utility 200 to site controller 110. A typical operation of site controller 110 without any instruction from utility 200 comprises the steps of firstly, monitoring consumption power (step 209), in particular, management site power 105 which is supplied by utility 200 to management site 100 by proprietary power meter 100*m*; secondly, monitoring power difference (step 211) by site controller 110. Power difference 211 is determined by finding the summation of a total consumption power in EV charging site 101 and office building site 102*a*. Then finding the difference between the total consumption power and a threshold power (the difference=the threshold power-the total consumption power). Ideally, the total consumption power is less than the threshold power which will yield a positive value. However, if the difference between the total consumption power and the threshold power yields negative value (Yes at step 211*a*), step 212 of suppressing EV charging site 101 is initiated. Otherwise, site controller 110 continues its normal operation (step 213) to detect any surge in the total consumption power.

Step 211 and 211*a* may be replaced with comparing the total consumption with the threshold power such as step 252*a* in FIG. 9 mentioned later.

There is an operational limit or threshold power 222 and infrastructure limit 220 which is a power agreed between utility 200 and management site 100. Threshold power 222 is derived from power 220. For example, utility is to supply 100 kW of power to management site 100, site controller 110 can multiply a multiplier of 80% to derive the threshold power of 80 kW. A bigger magnitude in the multiplier will result in a narrow margin i.e., shorter time for any form of intervention by site controller 110. If the consumption power exceeds the 80 kW, step 212 of suppression will be initiated by site controller 110 to resume normal power consumption.

During peak hours or a high demand period, there are measures to ensure the transmission of power flow is optimised. There is a priority in the suppression of EV charging site 101 to maintain normal operation of the power network efficiently.

The first is to suppress first EV charger 101*a* which is directly controlled by site controller 110. The second is to suppress the second EV Charger which is indirectly controlled by site controller 110. In the case when the suppression on EV charging site 101 does not bring down the consumption power, storage battery 101*s* in EV charging site 101 will be discharged to supply power to EV charging sites 101*a*, 101*b* and not using the power from utility 200.

First EV charger 101*a* is suppressed first because it is directly coupled to the site controller. The direct coupling of the first EV charger and site controller 110 is possible because the communication protocol used is an open standard communication protocol which is easier to adopt and widely used. In other words, the communication between first EV charger 101*a* and site controller 110 is faster as compared to an indirect coupling. Second EV charger 101*b* adopts its proprietary communication protocol which has to go through the server of the second EV charging operator. In other words, the time to communicate with second EV charger 101*b* is slower.

In a normal operation of site controller 110, the discharging of storage battery 101*s* begins whenever there is a power surge in the consumption power so as not to reply on the utility power. After doing so, the sequence of suppression first EV charger 101*a* and second EV charger 101*b* follows.

Figure 6B:
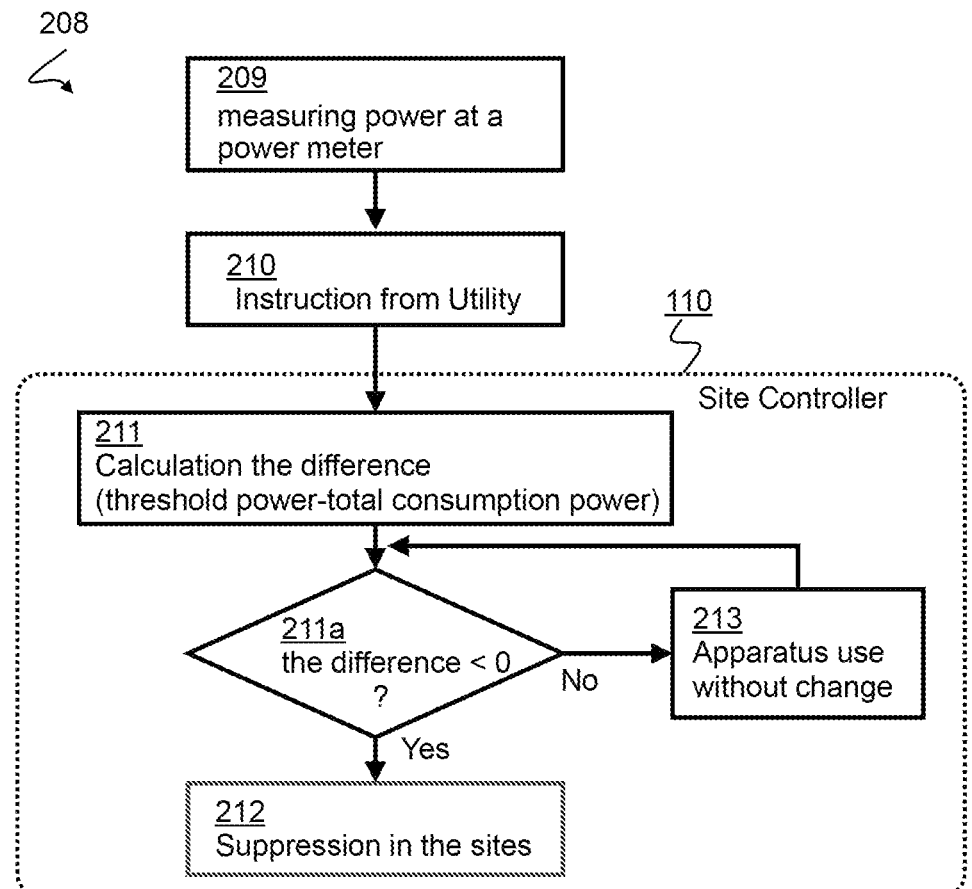
FIG. 6B illustrates a flow chart in which there is instruction from the utility to the site controller.

FIG. 6B (208) illustrates a flow chart in which there is instruction from utility 200 to site controller 110. Based on the instruction from utility 200, site controller 110 can communicate a buffering signal and a demand response (DR) signal. The buffering signal and the demand response signal can be operating in two modes namely a scheduled mode and a non-schedule mode. The scheduled mode comprises a dynamic buffering, a scheduled buffering, a dynamic demand response and a scheduled demand response. In a normal operation, site controller 110 operates in a non-scheduled mode. The buffering signal includes, for example, maximum power 220 shown in FIG. 7A mentioned later and new maximum power 220*a* shown in FIG. 7B mentioned later.

The difference with the flowchart in FIG. 6A is additional step 210 of receiving an instruction from utility 200 after step 209 of monitoring the consumption power, in particular, management site power 105 which is supplied by utility 200 to management site 100 by proprietary power meter 100*m*. The priority of suppression can be similar to non-instructional utility 200 as shown in FIG. 6A. Otherwise, utility 200 can communicate specific instructions to site controller 110 to turn off certain site including first site 101 and second site 102 for a period of time, or limit power to the EV site chargers. The rule of not exceeding power 220 must be adhered. Threshold power 222 is below power 220. Another possible scenario is to have threshold power 222 set at a percentage of target power 220 e.g., 80% of the target power.

$$\text{Threshold power} = 80\% \times \text{target power}$$

In both scenario of non-instruction (FIG. 6A) and instruction from utility 200 (FIG. 6B), when the suppression of EV charging site 101 including the discharging of storage battery 101s are not adequate to resume a normal consumption power, power consuming site 102 may be considered in the next suppression sequence.

Figure 7A:
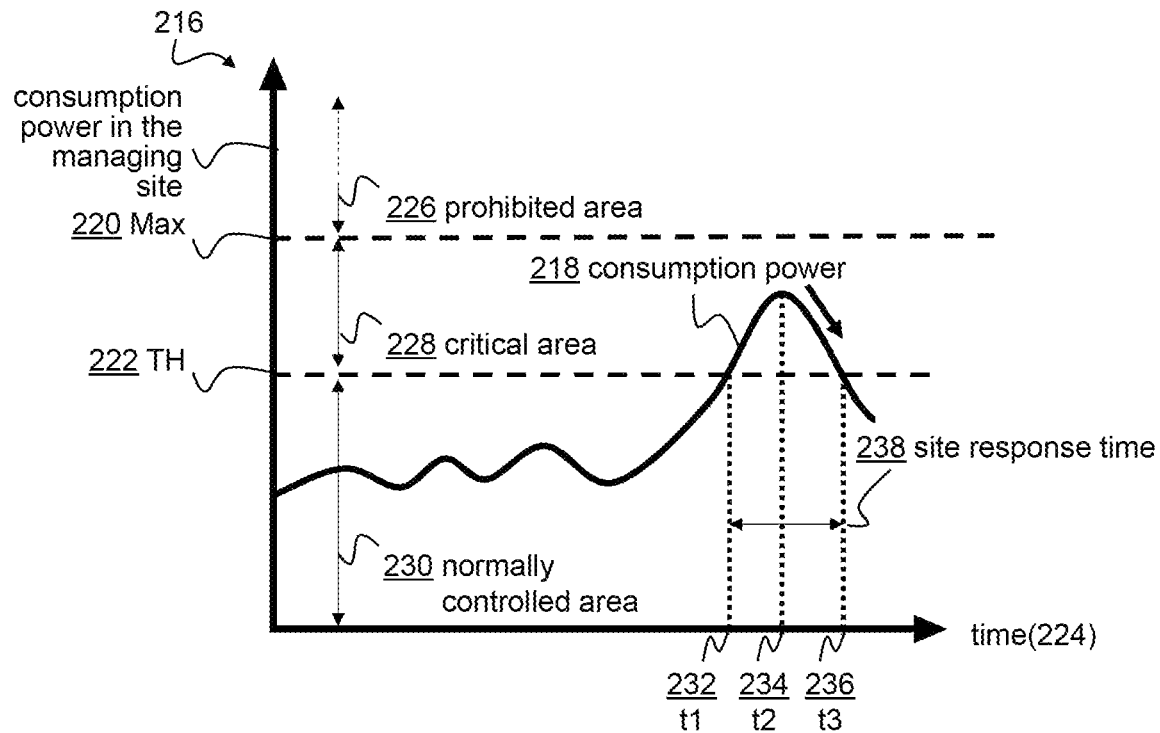
FIG. 7A illustrates a consumption power profile at the management site with no instruction.

FIG. 7A (216) illustrates the consumption power profile at the management site with no instruction. The consumption power is the total power consumed by EV charging site 101 and office building site 102 i.e., first consumption power 103 consumed by EV charging site 101 and second consumption power 104 consumed by office building site 102.

The power consumed over period (time) 224 produces consumption power profile 216. Maximum power 220 as shown on y-axis 218 of the chart is analogous to the target power or infrastructure limit which is also known as contracted value 220. Contracted value 220 is an agreed upon value with utility 200. Utility 200 is able to fulfil its power delivery to management site 100. At the same time, management site 100 is obligated to control the power demands of the loads within contracted value 220. The x-axis is time 224.

Threshold power TH 222 is a percentage of maximum power 220 or a lower value than maximum power 220. If consumption power 218 exceeds threshold power TH 222, there is a danger of stressing the power network and there is a need to intervene to bring down consumption power 218 below threshold power 222. Otherwise, consumption power 218 may exceed maximum power 220 stipulated which will cause a major disruption in the power network.

Prohibited range 226 is defined as consumption power 218 exceeding maximum power 220. Crossing maximum power 220 may cause a major power disruption by overloading the power network.

Critical range 228 is defined as consumption power 218 exceeding threshold power 222 but below maximum power 220. This may indicate a threat to the stability of the power supply to management site 100 and immediate interventions are required to bring consumption power 218 below threshold power 222.

Normal range 230 is defined as consumption power 218 below threshold power 222.

Consumption power profile 216 corresponds to FIG. 6A where there is no instruction from utility 200. There are three distinct time t1 232, t2 234 and t3 236 in consumption power profile 216.

t1 to t3 is site response time 238 from a time when a power surge is detected to resumption to normal power range 230. The power surge is a state where the consumption power exceeds threshold power 222. This is also known as site response time (tr) 238. (tr) is calculated by the following formula, (tr)=(t3)−(t1).

t1 232 is a time of initiation for site controller 110 to communicate with EV charging site 101 to initiate suppression. This is also known as suppression initiation time (t1) 232 by site controller 110 whereby consumption power 218 exceeds threshold power 222.

t2 234 is a time when EV charging site 101 responded to interventions from site controller 110. It is also known as peak consumption power time (t2) 234 whereby consumption power 218 reaches a peak and EV charging site 101 responded to interventions initiated by site controller 110.

t3 236 is a resumption of normal consumption power time 236 whereby consumption power 218 goes below threshold power 222.

Figure 7B:
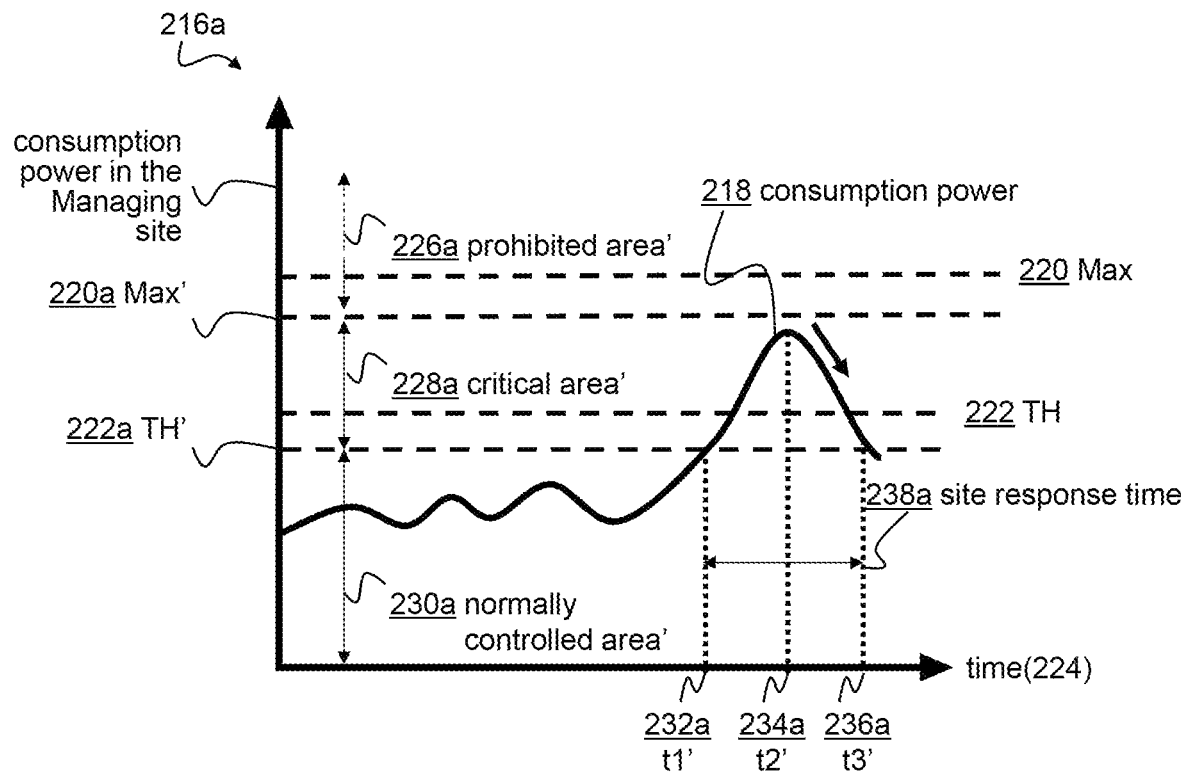
FIG. 7B illustrates a consumption power profile at the management site with instruction.

FIG. 7B (216a) illustrates a consumption power profile at management site 110 with instruction. This profile 216a corresponds to FIG. 6B where there is instruction from utility 200. In this setting, utility 200 and site management 100 with site controller 110 have already pre-determined a multiplier to set new threshold power 222a. The multiplier is variable and is agreed upon by utility 200 and site controller 110 in management site 100.

In the previous setting whereby management site 110 receives no instructions from utility 200, the threshold power is determined solely by site controller 110 in management site 100. For example, the threshold power is fixed at by using a fixed multiplier of 80% of the maximum power.

The instruction from utility 200 to site controller 110 can instruct site controller 110 that new maximum power 220a is lowered and the corresponding new threshold power 222a is reduced as well. Correspondingly, new prohibited range 226a, new critical range 228a and new normal range 230a are created so is new site response time 238a, new suppression initiation time 232a, new peak consumption power time 234a and a new resumption of normal consumption power time 236a. Consumption power 218 profile is similar to FIG. 7A, this is to provide a comparison in the case when new maximum power 220a changes other variables change as well assuming the multiplier is unchanged. If the multiplier is changed new threshold power 222a will be changed as well as the times new t1 232a, new t2 234a, and new t3 236a.

Scenarios which typically warrant instructions from utility, include peak power times or possible disruptions in power grid infrastructure.

Figure 8:
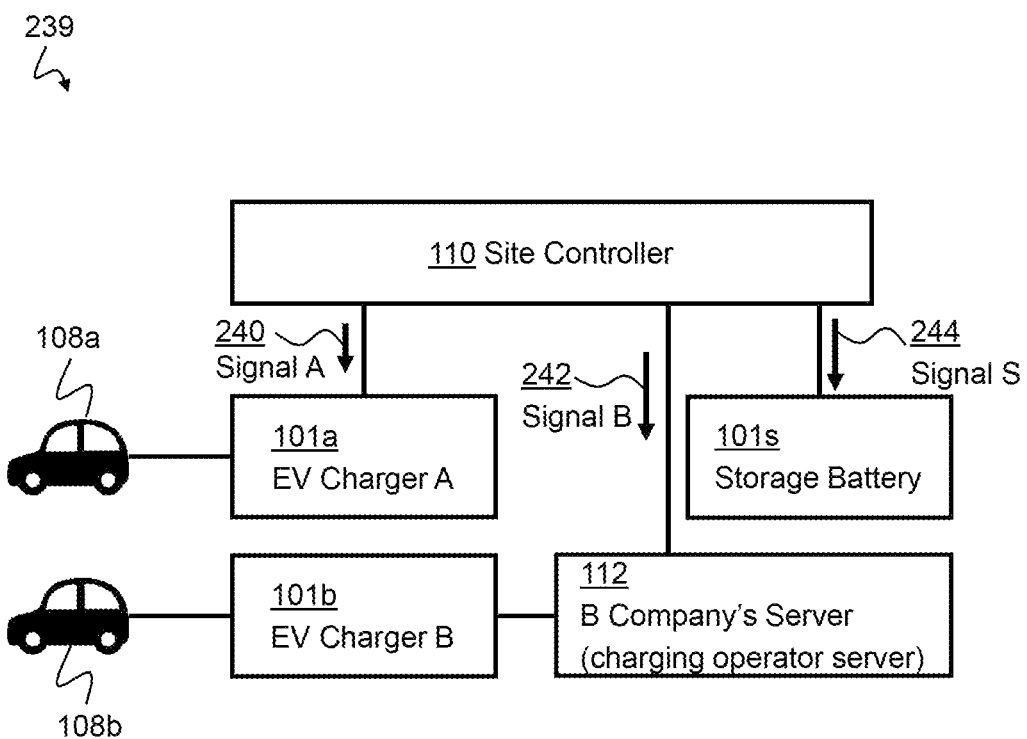
FIG. 8 illustrates a relationship of the EV chargers and the power consumption profile.

FIG. 8 (239) illustrates a relationship of EV chargers 101a, 101b and the power consumption profile specifically the relationship of EV chargers 101a, 101b and the power consumption profile of FIG. 7A and FIG. 7B.

Site controller 110 is coupled directly to first EV charger 101a whilst second EV charger 101b is indirectly coupled to site controller 110 via charging operator server 112. Storage battery 101s is coupled to site controller 110 directly. Site controller 110 sends charging or discharging signal A 240, charging or discharging signal B 242 and charging or discharging signal S 244 to first EV charger 101a, second EV charger 101b and storage battery 101s respectively.

Once consumption power 218 exceeds threshold power 222, 222a at the time of t1 232, 232a, site controller 110 will curb the energy flow.

First EV charger 101a is first to be suppressed because of the direct communication with site controller 110. Second EV charger 101b is second to be suppressed because of indirect communication resulting in time lag. The office building site is third to be suppressed because daily normal functioning of electrical loads needs to be maintained. Storage battery 101s is the method to be discharged to supply energy to the sites. Storage battery 101s acts as a backup power supply. Normally, the energy supply from storage battery 101s is the first to be engaged before power suppression is initiated.

Figure 9:
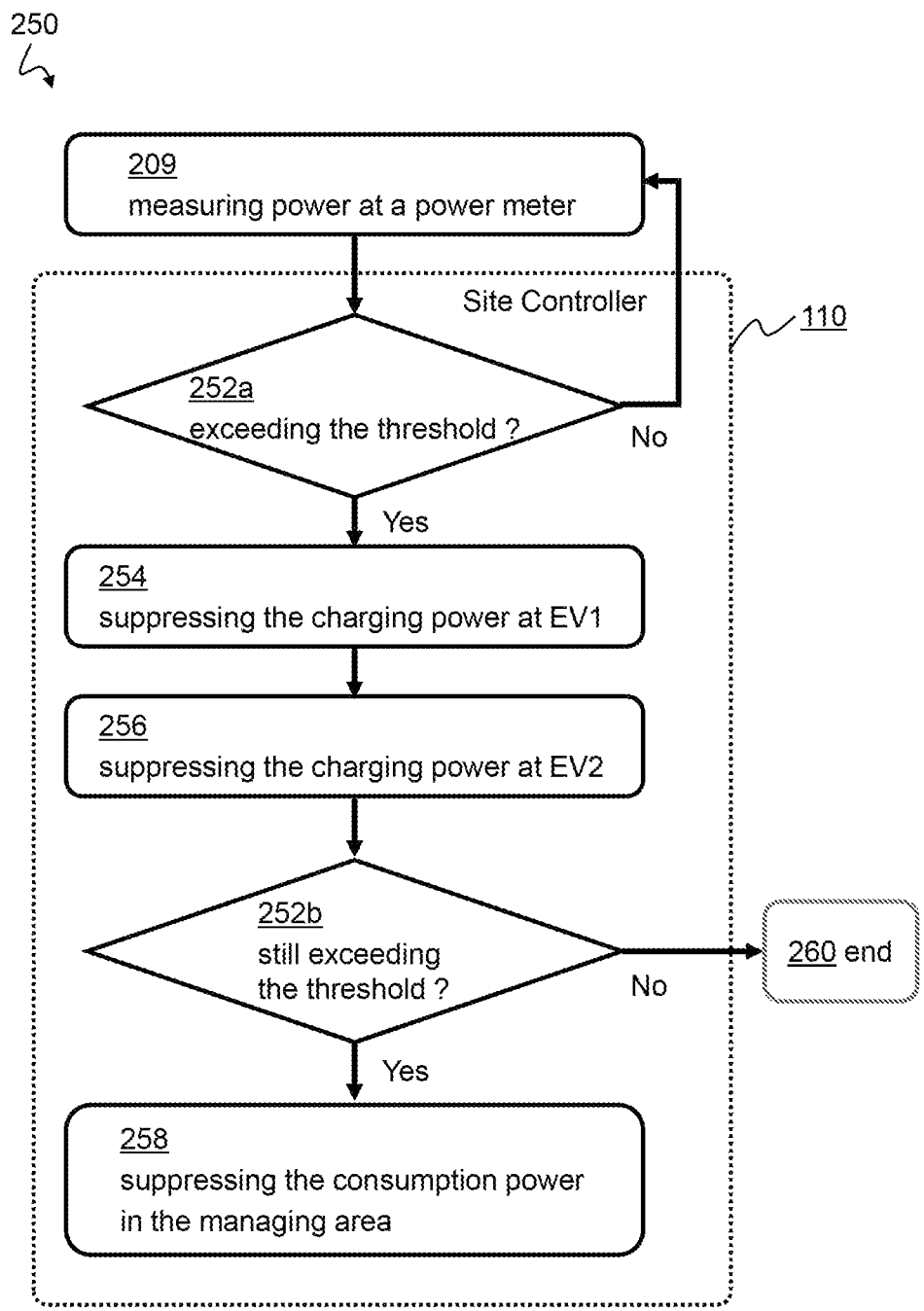
FIG. 9 illustrates a priority of suppression for EV charging.

FIG. 9 (250) illustrates a priority of suppression for EV charging. A method of suppressing EV chargers 101a, 101b in sequence comprises the steps of firstly, monitoring consumption power (step 209) by proprietary power meter 100m; secondly, checking by site controller 110 whether the consumption power exceeds the threshold power (step 252a). If the threshold power were not exceeded (No), site controller 110 continues to monitor the consumption power (step 209). If the threshold power were exceeded (Yes), a charging power of first EV charger 101a will be suppressed (step 254); thirdly, a charging power of second EV charger will be suppressed (step 256); fourthly, checking again whether the consumption power exceeds threshold power (step 252b). If the threshold power were not exceeded (No), site controller 110 ends (step 260) the suppressing process. Otherwise, site controller 110 suppresses power consuming site 102 (step 258).

Figure 10:
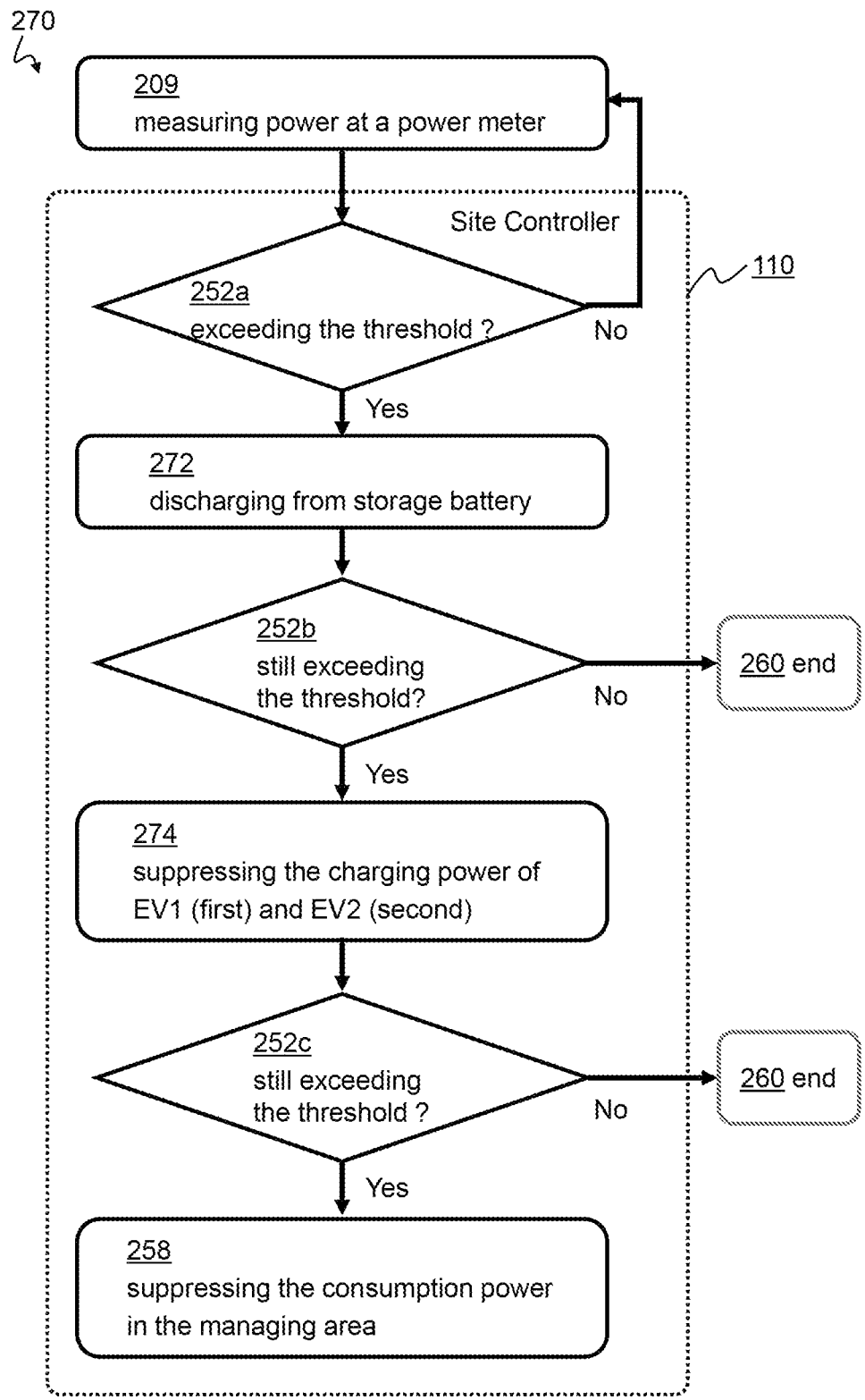
FIG. 10 illustrates an alternative priority of suppression or control for EV charging.

FIG. 10 (270) illustrates an alternative priority of suppression or control for EV charging. An alternative method of suppressing EV chargers 101a, 101b in sequence comprises the steps of firstly, monitoring consumption power (step 209) by proprietary power meter 100m; secondly, checking by site controller 110 whether the consumption power exceeds threshold power (step 252a). If the threshold power were not exceeded (No), site controller 110 continues to monitor the consumption power (step 209). If the threshold power were exceeded (Yes), the power from storage battery 101s is discharged (step 272); thirdly, checking by site controller 110 whether the consumption power exceeds threshold power (step 252b) second time. If the threshold power were exceeded (Yes), the charging power of first EV charger 101a and second EV charger 101b are suppressed (step 274). If the threshold power were not exceeded (No), site controller 110 ends (step 260) the suppressing process; fourthly, checking by site controller 110 whether the consumption power exceeds threshold power (step 252c) third time. If the threshold power were exceeded (Yes), site controller 110 suppresses power consuming site 102 (step 258). If the threshold power were not exceeded (No), site controller 110 ends (step 260) the suppressing process.

Figure 11:
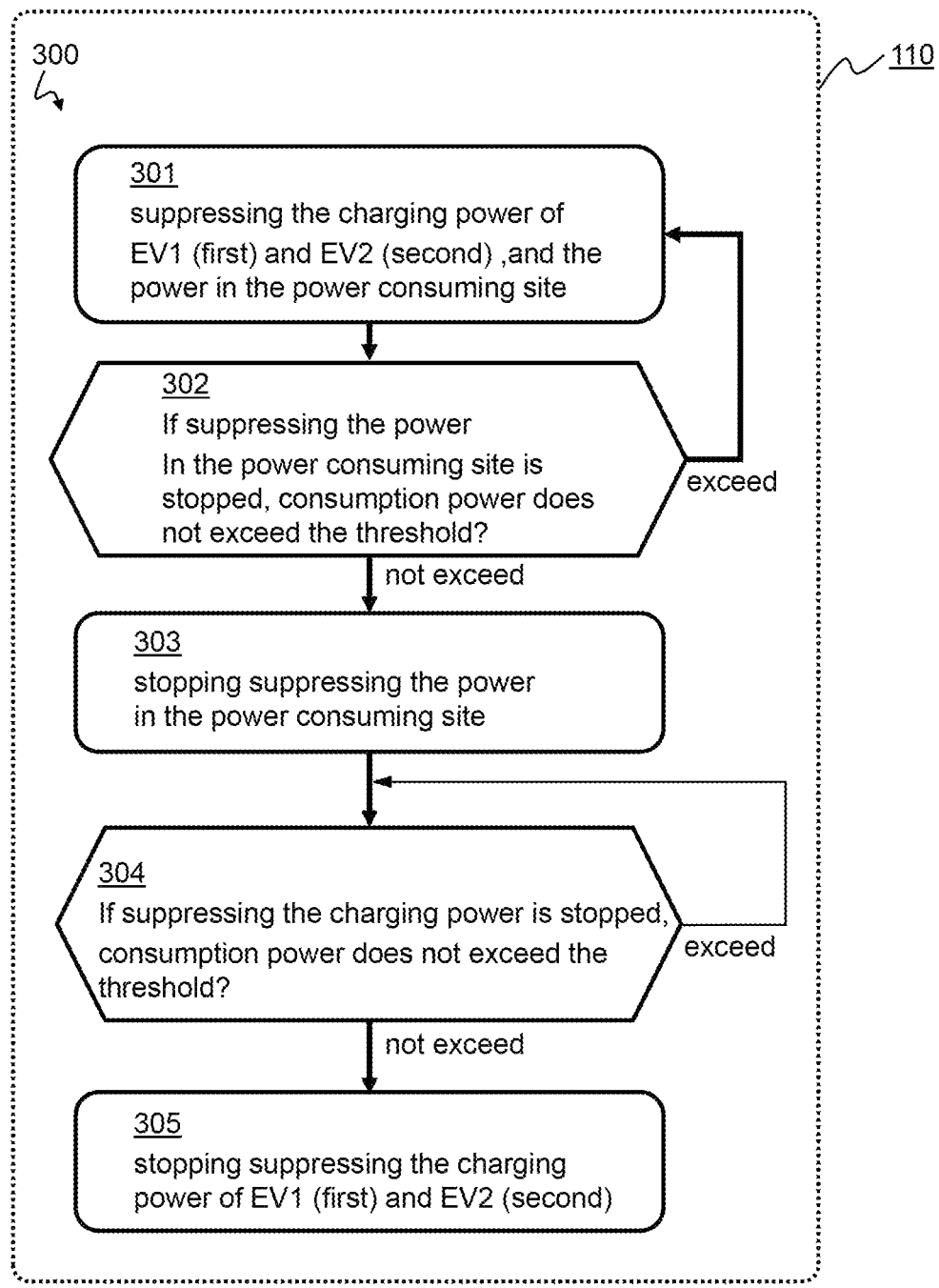
FIG. 11 illustrates a priority of stopping suppression for EV charging.

FIG. 11 (300) illustrates a priority of stopping suppression for EV charging. A method of stopping suppressing EV chargers 101a, 101b comprises the steps of firstly, a charging power of first EV charger 101a and second EV charger 101b, and a power in power consuming site 102 are being suppressed (step 301).; secondly, checking by site controller 110 whether if suppressing the power in the power consuming site is stopped, the consumption power does not exceed the threshold power (step 302). If the consumption power exceeds the threshold power (exceed), site controller 110 continues to perform step 301. If the consumption power does not exceed the threshold power (not exceed), site controller 110 stops suppressing the power in the power consuming site 102 (step 303); thirdly, checking by site controller 110 whether if suppressing the charging power is stopped, the consumption power does not exceed the threshold power (step 304). If the consumption power exceeds the threshold power (exceed), site controller 110 continues to perform step 304. If the consumption power does not exceed the threshold power (not exceed), site controller 110 stops suppressing charging power of first EV charger 101a and second EV charger 101b (step 305). In summary, site controller 110 stops suppressing the power in power consuming site 102 before stopping suppressing the charging power of first EV charger 101a and second EV charger 101b when the consumption power drops less than the threshold power.

It will be apparent that various other modifications and adaptations of the application will be apparent to the person skilled in the art after reading the foregoing disclosure without departing from the spirit and scope of the application and it is intended that all such modifications and adaptations come within the scope of the appended claims.

REFERENCE NUMERALS 100 management site, power network
100m proprietary power meter
100u utility power meter
101 first site, EV charging site
101a first EV charger
101b second EV charger
101s storage battery
102 second site, office building site, power consuming site
102a first lighting, first air conditioner
102b second lighting, second air conditioner
103 first consumption power
104 second consumption power
105 service point power, management site power
106 utility power
107a first site switch
107b battery switch
107c first EV charger switch
107d second EV charger switch
107e second site switch
107f first lighting, air conditioner switch
107g second lighting, air conditioner switch
108a first electric vehicle
108b second electric vehicle
110 site controller
110c processor
110r controller router
110s controller switch
111 proprietary server, company's Cloud server
112 charging operator server
116 general layout of the management site
117 line diagram of the management site
118 further detail of the management site
119 communication layout of the management site and the utility
120 site controller in the management site
199 an improved communication among the utility, the site controller and the EV chargers
200 utility
200c utility control system
200s utility server
201 standard communication protocol
202 proprietary communication protocol
203 external web server, e-fleet dispatcher
207 flow chart in which there is no instruction from the utility
208 flow chart in which there is instruction from the utility
209 monitoring consumption power
210 receiving instruction from utility
211 calculating a power difference
211a difference a negative value?
212 suppressing EV charging site
213 continues normal operation
216 consumption power profile without instruction from utility
218 consumption power
220 maximum power, target power, infrastructure limit, contracted value
222 threshold power
224 time
226 prohibited range
228 critical range
230 normal range
232 t1, suppression initiation time
234 t2, peak consumption power time
236 t3, resumption of a normal consumption power time
238 tr, site response time
216a consumption power profile with instruction from utility
220a new maximum power, new target power, new infrastructure limit, new contracted value
222a new threshold power
226a new prohibited range 228a new critical range
230a new normal range
232a new t1, new suppression initiation time
234a new t2, new peak consumption power time
236a new t3, new resumption of a normal consumption power time
238a new tr, new site response time
239 relationship of EV chargers 101a, 101b and the power consumption profile
240 charging or discharging signal A
242 charging or discharging signal B
244 charging or discharging signal S
250 priority of suppression for EV charging
252 checking whether the consumption power exceeds the threshold power
254 suppressing the first EV charger
256 suppressing the second EV charger
258 suppressing the power consuming site
260 ends suppression
270 alternative priority of suppression or control for EV charging
272 discharging of power from the storage battery
274 suppressing the charging power of the first EV charger and the second EV charger
280 another alternative priority of suppression or control for EV charging
282 determining which EV charger 101a, 101b to suppress
284 determining whether the number of EV charger at the second EV charger less than the first EV charger
286 determining if the site response time of the second EV charger is less than the first EV charger
288 suppressing the second EV charger
290 suppressing the first EV charger

The invention claimed is:

1. A method of controlling an EV charger which is disposed at a charging site by a controller providing a charging signal thereto for controlling the EV charger to operate within a maximum consumption power that is allowable at a management site including the charging site, the method comprising:
receiving a consumption power reading used in the management site, and
controlling a charging power to the EV charger so that the consumption charging power is less than the maximum consumption power,
wherein the controller is configured to communicate the charging signal with the EV charger either directly or indirectly using more than one communication scheme in actual time;
wherein the charging site further comprises
a first EV charger for directly communicating with the controller using a first communication scheme and not via a server; and
a second EV charger for indirectly communicating with the controller using a second communication scheme and via a server, the second communication scheme using a communication protocol different from a communication protocol of the first communication scheme; and
wherein when the consumption power exceeds a threshold power, the controller suppresses the charging power of the first EV charger and the second EV charger.

2. The method of controlling the EV charger of claim 1, wherein after a charging power of the first EV charger is suppressed, a charging power of the second EV charger is suppressed.

3. The method of controlling the EV charger of claim 1, wherein the management site includes a storage battery site, and
the controller prioritizes supplementing the consumption power by discharging power from the storage battery site over suppressing the charging power of the first EV charger.

4. The method of controlling the EV charger of claim 1, wherein the management site includes a storage battery site, and
the controller sends a discharging signal to the storage battery site for supplementing the consumption power by discharging power from the storage battery site before suppressing the charging power of the first EV charger.

5. The method of controlling the EV charger of claim 1, wherein the management site includes a power consuming site, and
when the consumption power in the management site is still not under the threshold power, the controller sends a signal to suppress the power in the power consuming site.

6. The method of controlling the EV charger of claim 1, wherein the controller stops suppressing a charging power of the first EV charger and the second charger when the consumption power drops less than the threshold power.

7. The method of controlling the EV charger of claim 5, wherein the controller stops suppressing the power in the power consuming site before stopping suppressing the charging power of the first EV charger and the second EV charger when the consumption power drops less than the threshold power.

8. The method of controlling the EV charger of claim 1, wherein the controller sends a charging signal to the second EV charger via a server.

9. The method of controlling the EV charger of claim 6, wherein the server is owned by an owner of the second EV charger.

10. The method of controlling the EV charger of claim 1, wherein the management site having a measuring unit for measuring the consumption power of the management site in real-time, and the controller receives a signal of the consumption power.

11. The method of controlling the EV charger of claim 10, wherein the management site has a power consumption site, and the consumption power in the consumption site has the power of a lighting and an air conditioner.

12. The method of controlling the EV charger of claim 1, wherein after the controller receives a signal of demand response or buffering, the controller sets a new maximum power and a new threshold power which are lower than the maximum power and the threshold power.

13. The method of controlling the EV charger of claim 4, wherein the storage battery site is charged before and/or after a demand response or buffering period.

14. A method of controlling an EV charger which is disposed at a charging site by a controller providing a charging signal thereto for controlling the EV charger to operate within a maximum consumption power that is allowable at a management site, the method comprising:
receiving a consumption power reading used in the management site, and
controlling a charging power to the EV charger so that the consumption charging power is less than the maximum consuming power, wherein the controller is configured to communicate the charging signal with the EV charger either directly or indirectly using more than one communication scheme in actual time;

wherein the charging site further comprises a first EV charger for directly communicating with the controller using a first communication scheme and not via a server; and a second EV charger for indirectly communicating with the controller using a second communication scheme and via a server, the second communication scheme using a communication protocol different from a communication protocol of the first communication scheme.

15. A method of controlling a consumption power in a management site by a controller, the management site including a charging site and a power consuming site, the controller providing a charging signal for controlling an EV charger to operate within a maximum consumption power that is allowable at the management site, the method comprising:

receiving a consumption power reading used in the management site, and controlling a charging power to the EV charger so that the consumption charging power is less than the maximum consuming power, wherein the controller is configured to communicate the charging signal with the EV charger either directly or indirectly using more than one communication scheme in actual time;

wherein the charging site further comprises a first EV charger for directly communicating with the controller using a first communication scheme and not via a server; and a second EV charger for indirectly communicating with the controller using a second communication scheme and via a server, the second communication scheme using a communication protocol different from a communication protocol of the first communication scheme; and wherein when the consumption power exceeds the threshold power, the controller suppresses the charging power of the first EV charger and the second EV charger.

* * * * *